US012694593B2

(12) United States Patent
Li et al.

(10) Patent No.: US 12,694,593 B2
(45) Date of Patent: Jul. 28, 2026

(54) CREATING REAL-TIME INTERACTIVE VIDEOS

(71) Applicant: Lemon Inc., Grand Cayman (KY)

(72) Inventors: Peilin Li, Los Angeles, CA (US); Guoxian Song, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 145 days.

(21) Appl. No.: 18/388,785

(22) Filed: Nov. 10, 2023

(65) Prior Publication Data

US 2025/0157109 A1 May 15, 2025

(51) Int. Cl.
| | |
|---|---|
| *G06T 13/00* | (2011.01) |
| *G06T 7/246* | (2017.01) |
| *G06V 10/77* | (2022.01) |
| *G06V 10/94* | (2022.01) |
| *G06V 40/16* | (2022.01) |

(52) U.S. Cl.
CPC .............. *G06T 13/00* (2013.01); *G06T 7/248* (2017.01); *G06V 10/77* (2022.01); *G06V 10/945* (2022.01); *G06V 40/176* (2022.01); *G06T 2200/24* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | |
|---|---|---|
| 2019/0384967 A1 | 12/2019 | Sun et al. |
| 2021/0195142 A1* | 6/2021 | Mireles ................. A61M 39/08 |

| | | | |
|---|---|---|---|
| 2021/0264563 A1* | 8/2021 | Shen ........................ A63F 13/55 |
| 2021/0306557 A1* | 9/2021 | Voss ........................ H04N 23/64 |
| 2022/0247973 A1* | 8/2022 | Astarabadi ............. G06V 10/82 |
| 2023/0154087 A1 | 5/2023 | Iqbal et al. |
| 2023/0291980 A1 | 9/2023 | Yang et al. |

(Continued)

FOREIGN PATENT DOCUMENTS

| | | |
|---|---|---|
| CN | 114779948 A | 7/2022 |

OTHER PUBLICATIONS

Bodini M., "A Review of Facial Landmark Extraction in 2D Images and Videos Using Deep Learning," Big Data and Cognitive Computing, Feb. 13, 2019, vol. 3, No. 14 [Retrieved on Dec. 20, 2024] DOI: 10.3390/bdcc3010014 Whole document, in particular Section 1, 14 Pages.

(Continued)

*Primary Examiner* — Jeffrey J Chow
(74) *Attorney, Agent, or Firm* — BakerHostetler

(57) ABSTRACT

The present disclosure describes techniques for creating a real-time interactive video. A source image is generated by a first machine learning model based on capturing an image of a user. The image comprises a face of the user. One or more facial images of the user are captured. The one or more facial images depict one or more facial expressions. The source image and information extracted from the one or more facial images are input into a second machine learning model. The second machine learning model is configured and trained to transfer facial expressions of creators to machine-generated images in real-time. The real-time interactive video is created by dynamically driving the source image based on the one or more facial expressions.

20 Claims, 14 Drawing Sheets

(56)          References Cited

U.S. PATENT DOCUMENTS

2024/0355065 A1* 10/2024 Miller ................... G06T 19/006

OTHER PUBLICATIONS

International Written Opinion for International Application No. PCT/SG2024/050690 , mailed Dec. 31, 2024, 5 Pages.
Wu Y., et al., "Simultaneous Facial Landmark Detection, Pose and Deformation Estimation under Facial Occlusion," arXiv:1709. 08130 [cs.CV], Sep. 23, 2017 [Retrieved on Dec. 20, 2024] DOI:10. 48550/ARXIV.1709.08130 Whole document, in particular Abstract and Section 1., 10 Pages.

* cited by examiner

200

202

300

400

500

502

600

900

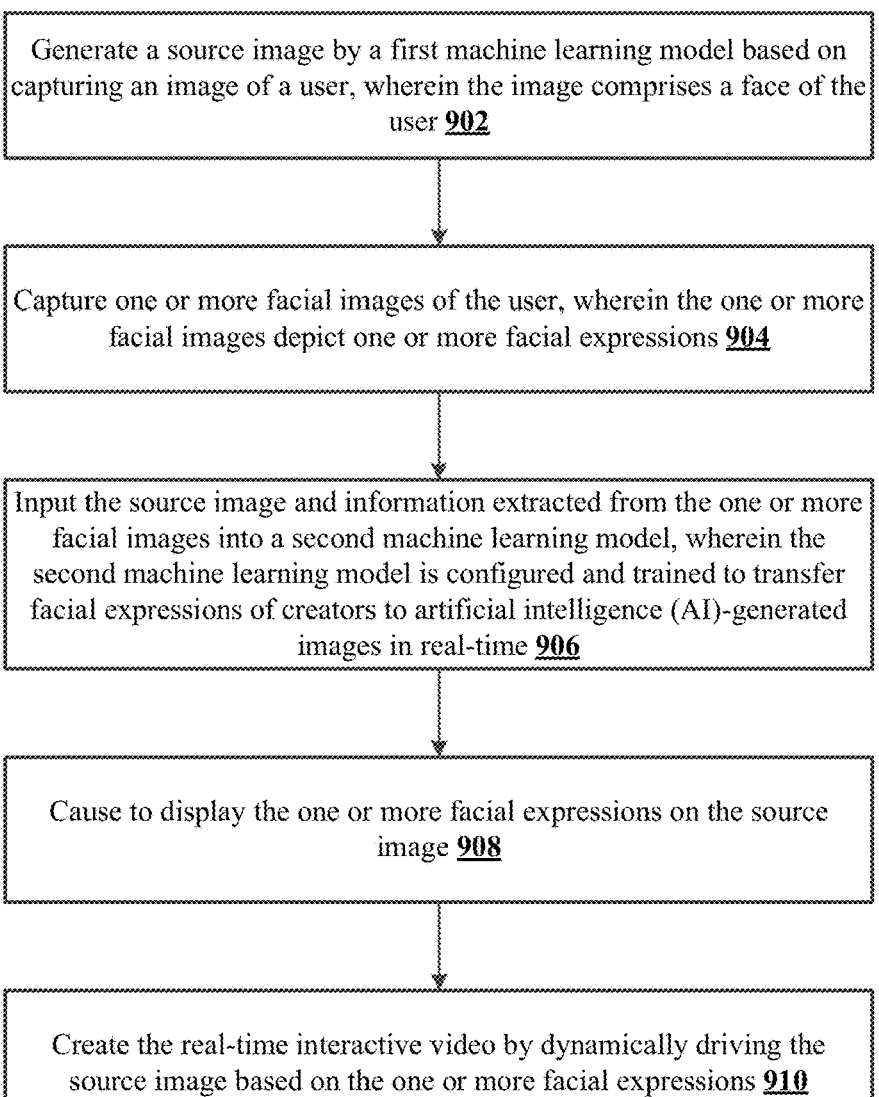

Generate a source image by a first machine learning model based on capturing an image of a user, wherein the image comprises a face of the user 902

Capture one or more facial images of the user, wherein the one or more facial images depict one or more facial expressions 904

Input the source image and information extracted from the one or more facial images into a second machine learning model, wherein the second machine learning model is configured and trained to transfer facial expressions of creators to artificial intelligence (AI)-generated images in real-time 906

Cause to display the one or more facial expressions on the source image 908

Create the real-time interactive video by dynamically driving the source image based on the one or more facial expressions 910

Cause to display an interface configured to guide a user to position a face at a predetermined location 1002

Generate a source image by a first machine learning model based on scanning the face positioned at the predetermined location 1004

Input the source image and information extracted from one or more facial images into a second machine learning model, wherein the second machine learning model is configured and trained to transfer facial expressions of creators to artificial intelligence (AI)-generated images in real-time 1006

FIG. 10

1100
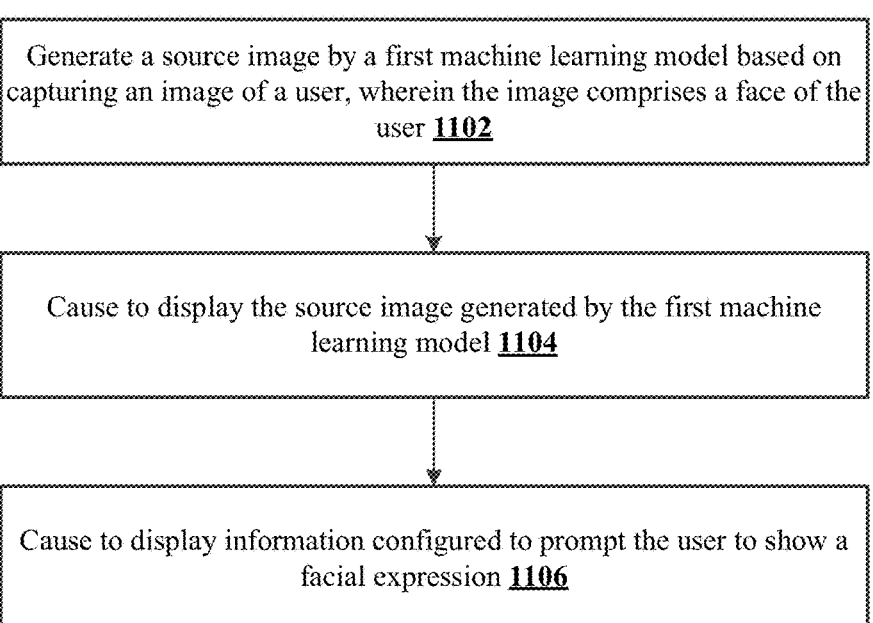
Generate a source image by a first machine learning model based on capturing an image of a user, wherein the image comprises a face of the user 1102
Cause to display the source image generated by the first machine learning model 1104
Cause to display information configured to prompt the user to show a facial expression 1106
FIG. 11

1200

Capture one or more facial images of the user, wherein the one or more facial images depict one or more facial expressions 1202

Extract facial landmark data from the one or more facial images 1204

Input the facial landmark data into a second machine learning model 1206

1300

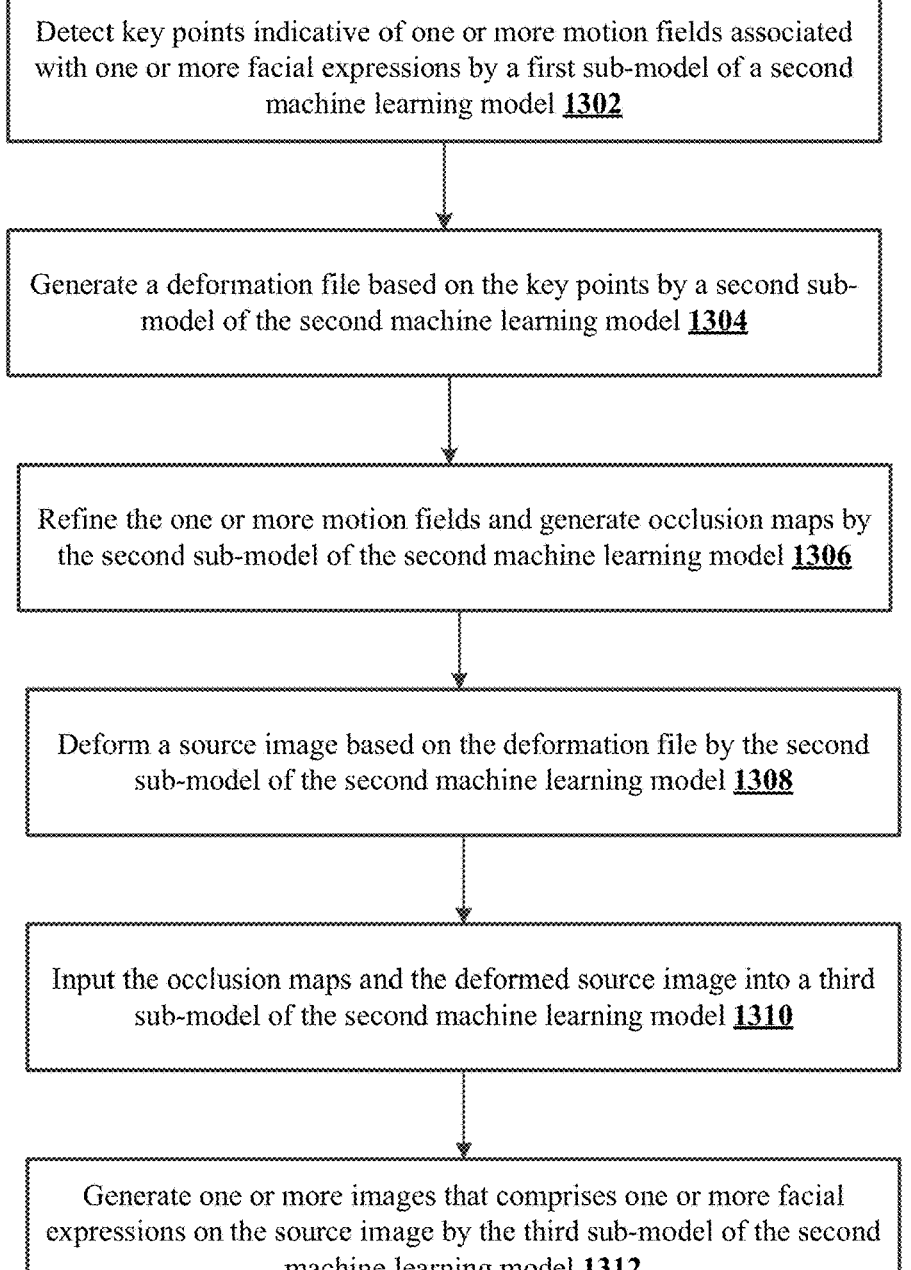

Detect key points indicative of one or more motion fields associated with one or more facial expressions by a first sub-model of a second machine learning model 1302

Generate a deformation file based on the key points by a second sub-model of the second machine learning model 1304

Refine the one or more motion fields and generate occlusion maps by the second sub-model of the second machine learning model 1306

Deform a source image based on the deformation file by the second sub-model of the second machine learning model 1308

Input the occlusion maps and the deformed source image into a third sub-model of the second machine learning model 1310

Generate one or more images that comprises one or more facial expressions on the source image by the third sub-model of the second machine learning model 1312

FIG. 13 input/output controller 1432 network interface controller 1422 network 1418 chipset 1406 storage controller 1424

ROM 1420

RAM 1408

GPU(s) 1405

CPU(s) 1404 mass storage device 1428

1400

CREATING REAL-TIME INTERACTIVE VIDEOS

BACKGROUND

Machine learning models are increasingly being used across a variety of industries to perform a variety of different tasks. Such tasks may include content generation. Improved techniques for utilizing machine learning models for content generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 9 shows an example process for creating real-time interactive videos in accordance with the present disclosure.

FIG. 10 shows an example process for creating real-time interactive videos in accordance with the present disclosure.

FIG. 11 shows an example process for creating real-time interactive videos in accordance with the present disclosure.

FIG. 13 shows an example process for creating real-time interactive videos in accordance with the present disclosure.

DETAILED DESCRIPTION OF ILLUSTRATIVE EMBODIMENTS

Machine learning models may be used for content generation. In particular, machine learning models may be used to generate static images for users. However, existing techniques of using machine learning models to generate content may lack interactivity with the users. Further, existing techniques may be unable to generate high quality video content, such as real-time video content. As such, improved techniques for content generation are needed.

Described herein are improved techniques for generating real-time interactive videos. An initial image or live feed of a user may be captured. First, facial detection may be used to identify the user's facial features, preserving them for generating one or more new images based on the initial image. AI may be used to generate new images based on the initial image. The new images may dynamically display the user's current facial features and/or expressions. For example, if the user opens his mouth, the new images may display a machine-generated character that resembles the user and that is opening his mouth. The new images may continue to reflect changes of the user's facial expressions in real time. The new images may, for example, constitute the frames of a video. The new images may be displayed on an interface of a device in real time.

Figure 1:
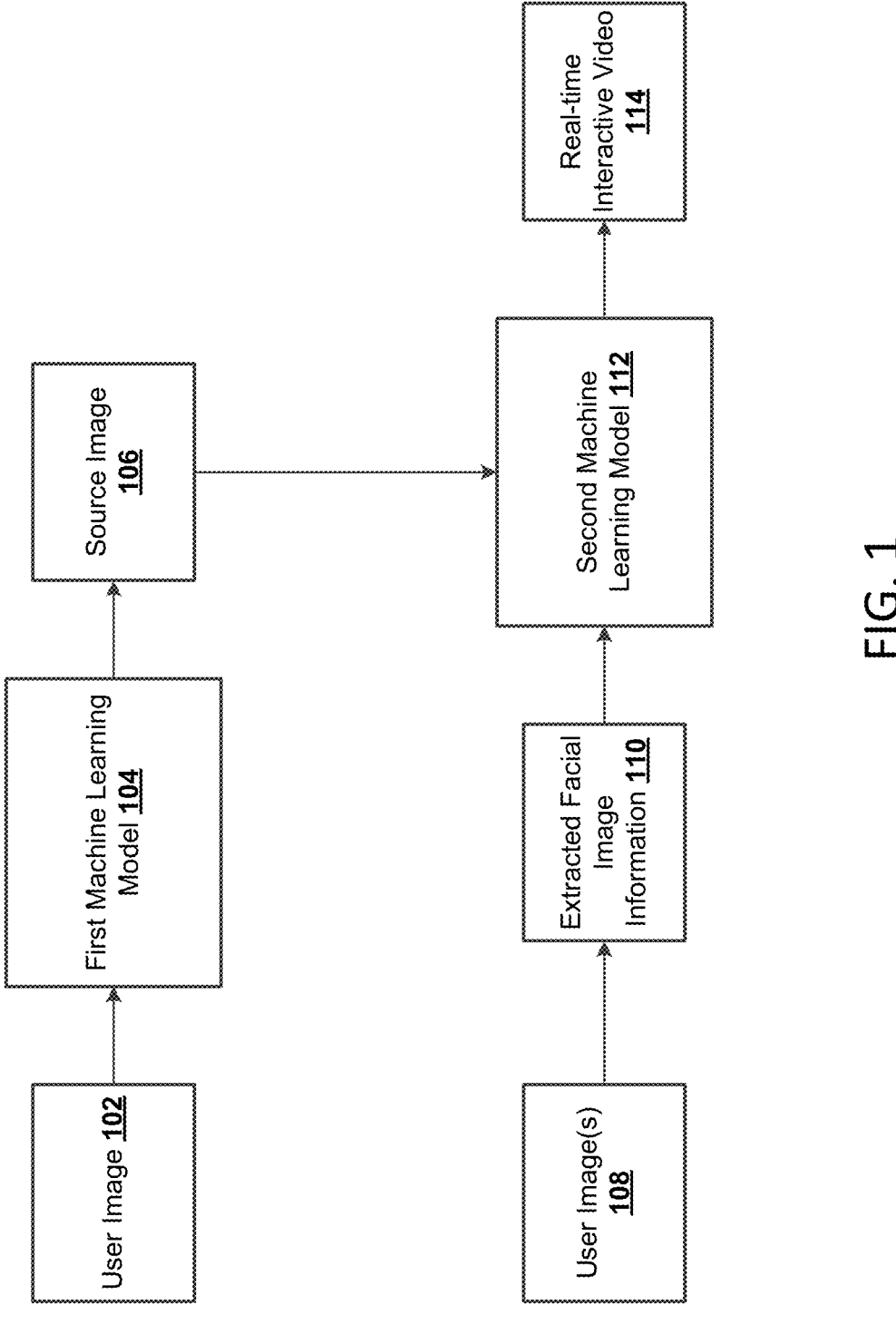
FIG. 1 shows an example system for creating real-time interactive videos in accordance with the present disclosure.

FIG. 1 illustrates an example system 100 in accordance with the present disclosure. The system 100 may be used for creating real-time interactive videos. For example, the system 100 may utilize a user's facial expression(s) to drive machine-generated images to create dynamic, real-time interactive videos. The system 100 may comprise a first machine learning model 104 and a second machine learning model 112. A user device (e.g., client device, mobile computing device, etc.) may comprise the system 100. For example, the user device may comprise the first machine learning model 104 and the second machine learning model 112.

A user may be prompted, such as via an interface of a user device (e.g., client device, mobile computing device, etc.), to capture an image of his or her face. For example, the user may be prompted or guided to position his or her face at a predetermined location on the interface. The user may utilize a camera device associated with the user device to capture the user image 102 (e.g., an image including the user's face). The camera device may be a component of the user device or separate from the user device. The user image 102 may depict the user's face. The user image 102 may be used to generate a source image 106. For example, the user image 102 may be input into a first machine learning model 104. The first machine learning model 104 may generate, based on the user image 102, the source image 106. The first machine learning model 104 may generate the source image 106 by scanning the user's face positioned at the predetermined location. The source image 106 may depict a machine-generated character or avatar, such as a machine-generated character or avatar that resembles the user in the user image 102. The source image 106 may be input into the second machine learning model 112. The source image 106 may be output and displayed on the interface of the client device.

The user may capture one or more additional images (e.g., user image(s) 108, driving images, etc.). The one or more additional images may be continuously captured. For example, the one or more additional images may be the frames of a real-time video feed depicting the user's facial expression(s). The user may capture the user images 108 in response to being prompted, such as via the interface of the user device (e.g., client device, mobile computing device, etc.), to make various facial expressions or facial movements. The user may utilize the camera device associated with the user device to capture the user image(s) 108. Information may be extracted from each of the user images 108 in real-time. The information may comprise facial image information, such as facial landmark data. The information may be extracted from each of the user images 108 using any suitable facial landmark recognition technique. The extracted facial image information 110 may be input into the second machine learning model 112.

The second machine learning model 112 may be configured and trained to transfer facial expressions of users (e.g., creators) to machine-generated images, such as the source image 106, in real-time. The second machine learning model 112 may transfer the facial expressions depicted in the user images 108 to the source image 106. For example, the second machine learning model 112 may transfer the facial expressions depicted in the user images 108 to the source image 106 using the extracted facial image information 110. The second machine learning model 112 may cause display of the facial expressions depicted in the user images 108 on the source image 106, such as via the interface of the client device in real-time. For example, if the extracted facial image information 110 corresponding to a first user image of the user images 108 indicates that the user is smiling in the first user image, the second machine learning model 112 may cause the machine-generated character or avatar depicted in the source image 106 to smile. If the extracted facial image information 110 corresponding to the next user image of the user images 108 indicates that the user is frowning in the next user image, the second machine learning model 112 may cause the machine-generated character or avatar depicted in the source image 106 to stop smiling and start frowning.

In embodiments, the second machine learning model 112 may create a real-time interactive video by dynamically driving the source image 106 based on the facial expressions depicted in the user images 108. For example, the second machine learning model 112 may utilize neural motion generative adversarial networks (GAN) technology to dynamically drive the source image 106 based on the facial motion in the user image(s) 108. Dynamically driving the source image 106 based on the facial motion in the user image(s) 108 enhances interactivity for the user during the content creation process and creates a more dynamic effect for the final video output.

Figure 2:
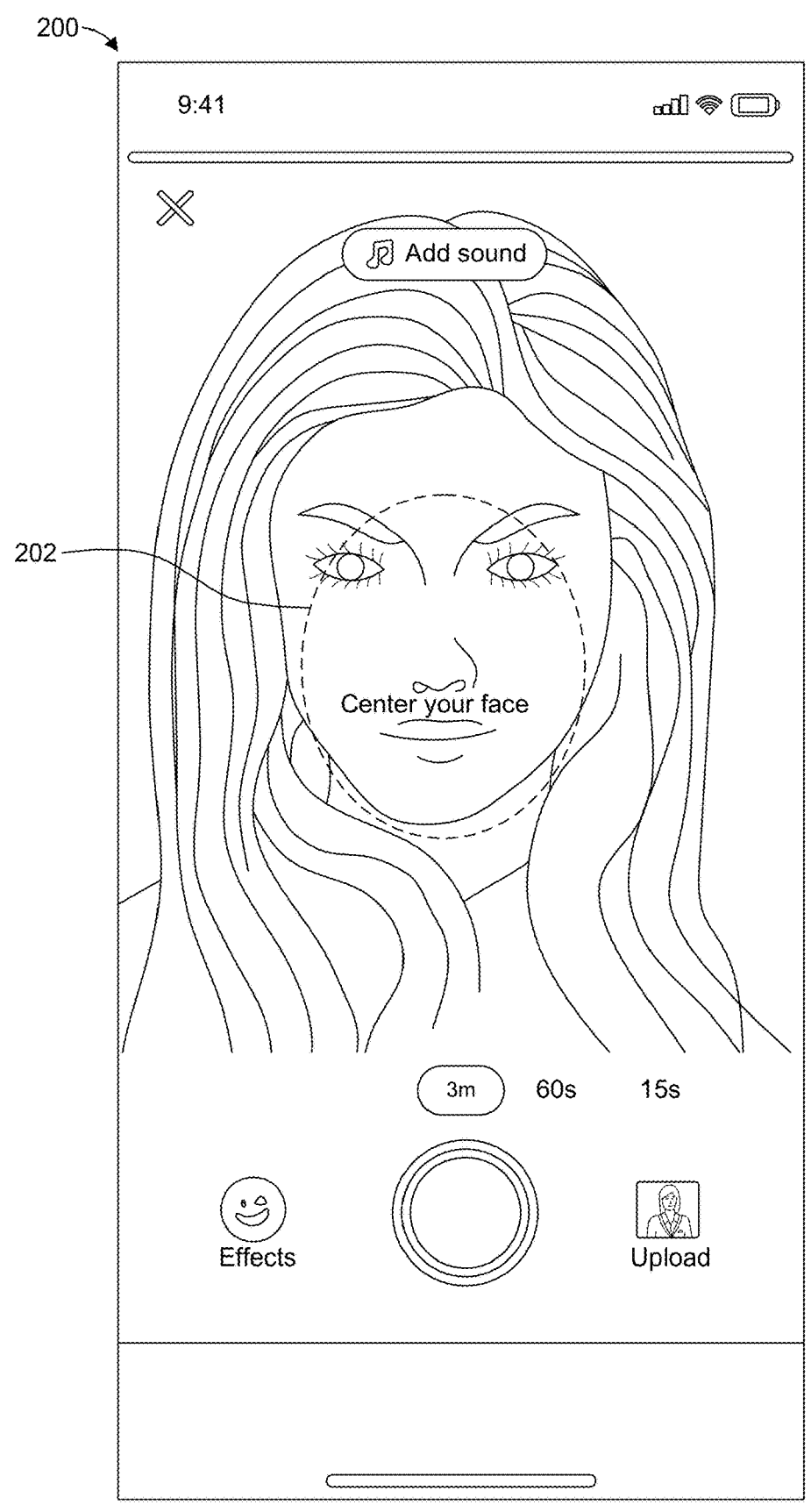
FIG. 2 shows an example user interface for creating real-time interactive videos in accordance with the present disclosure.
Figure 3:
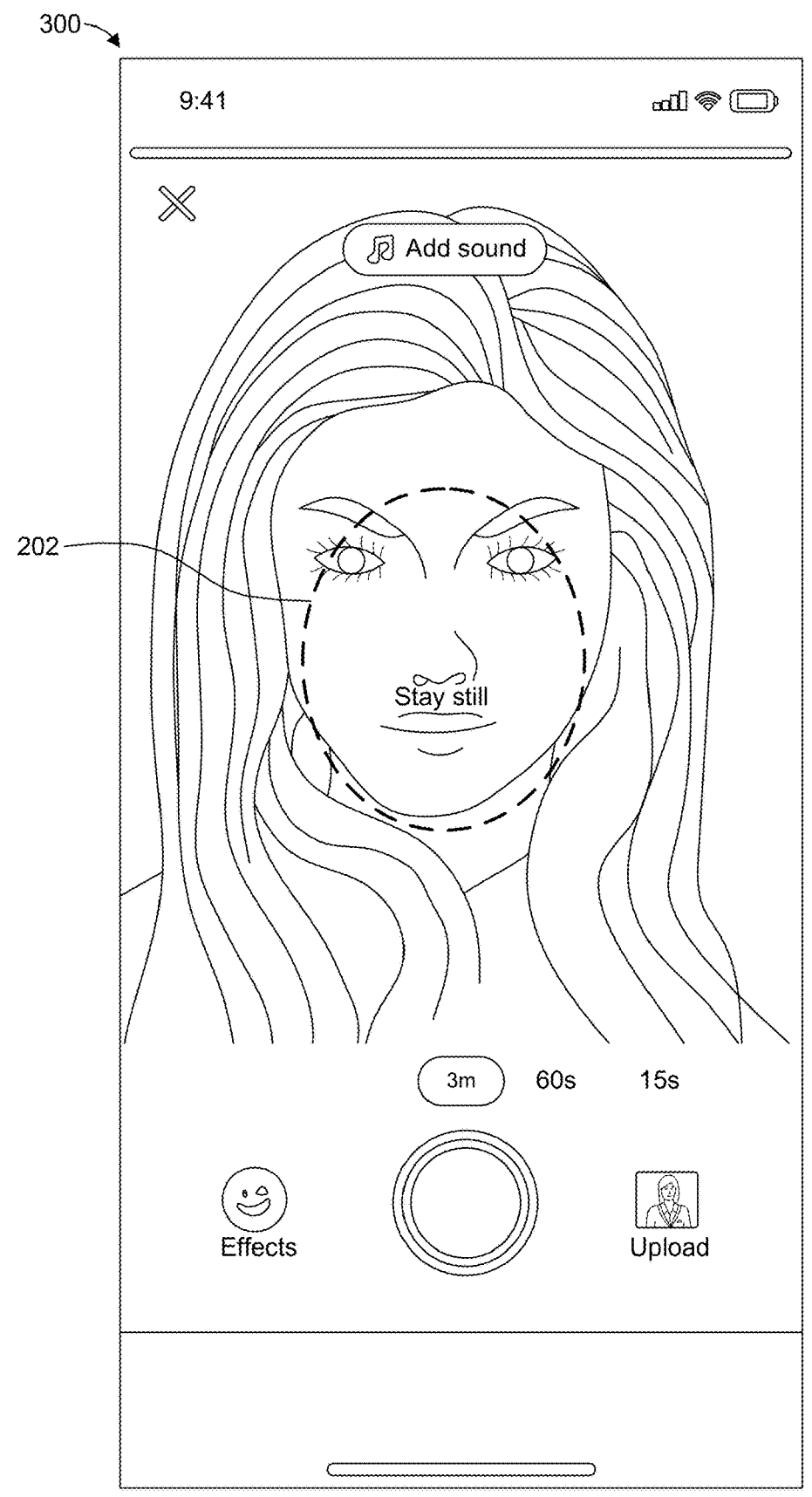
FIG. 3 shows an example user interface for creating real-time interactive videos in accordance with the present disclosure.

FIGS. 2-6 show user interfaces associated with creating real-time interactive video using the system 100. As shown in FIG. 2, a user interface (UI) 200 configured to guide the user to position his or her face at a predetermined location 202 may be displayed. The user interface 200 may be displayed on a user device (e.g., client device, mobile computing device, etc.). The user device may be associated with a camera device. As shown in FIG. 3, a UI 300 may be displayed. The UI 300 may be configured to instruct the user to refrain from moving his or her face out of the predetermined location 202 and/or to refrain from changing his or her facial expression.

Figure 4:
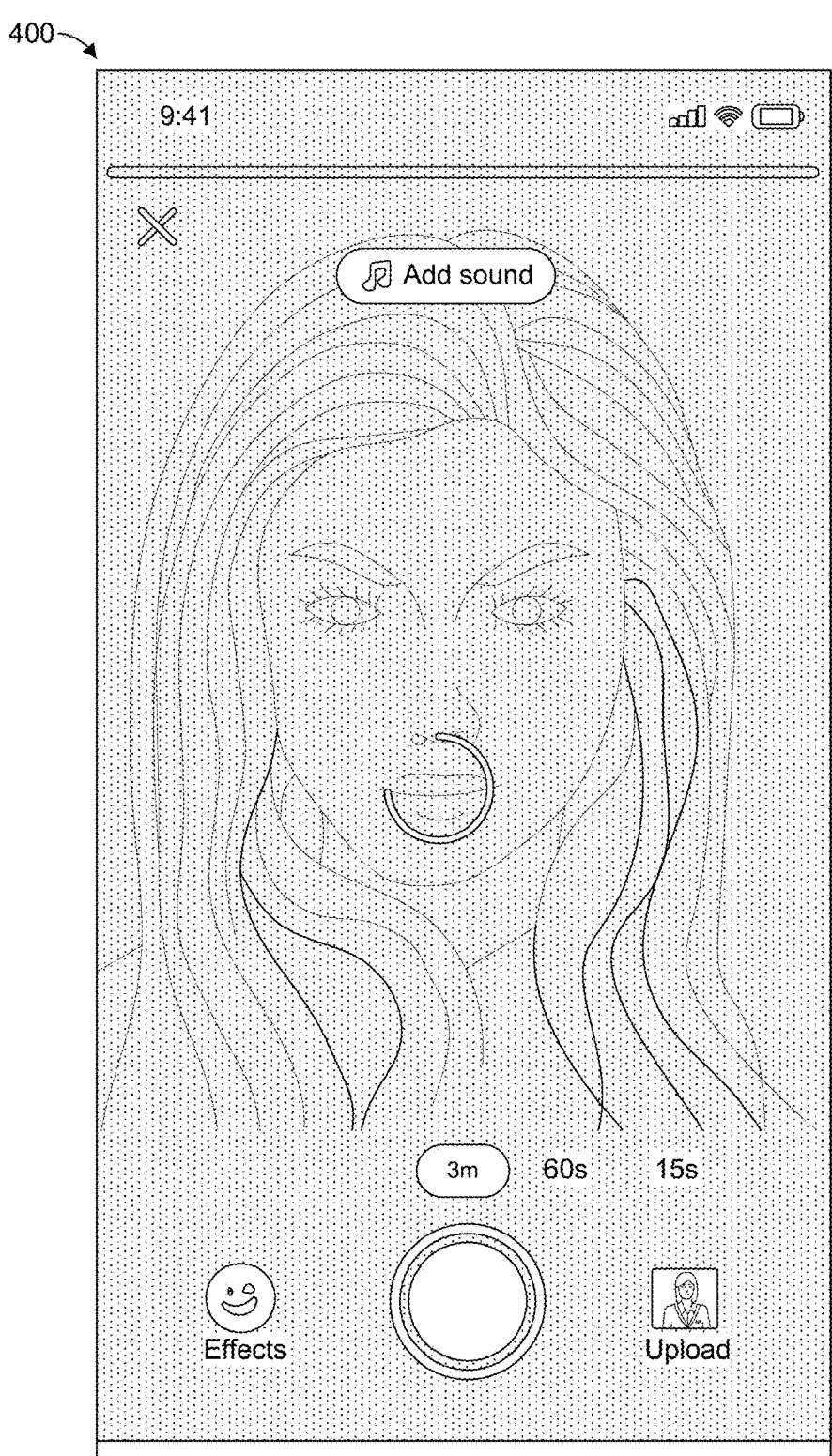
FIG. 4 shows an example user interface for creating real-time interactive videos in accordance with the present disclosure.
Figure 5:
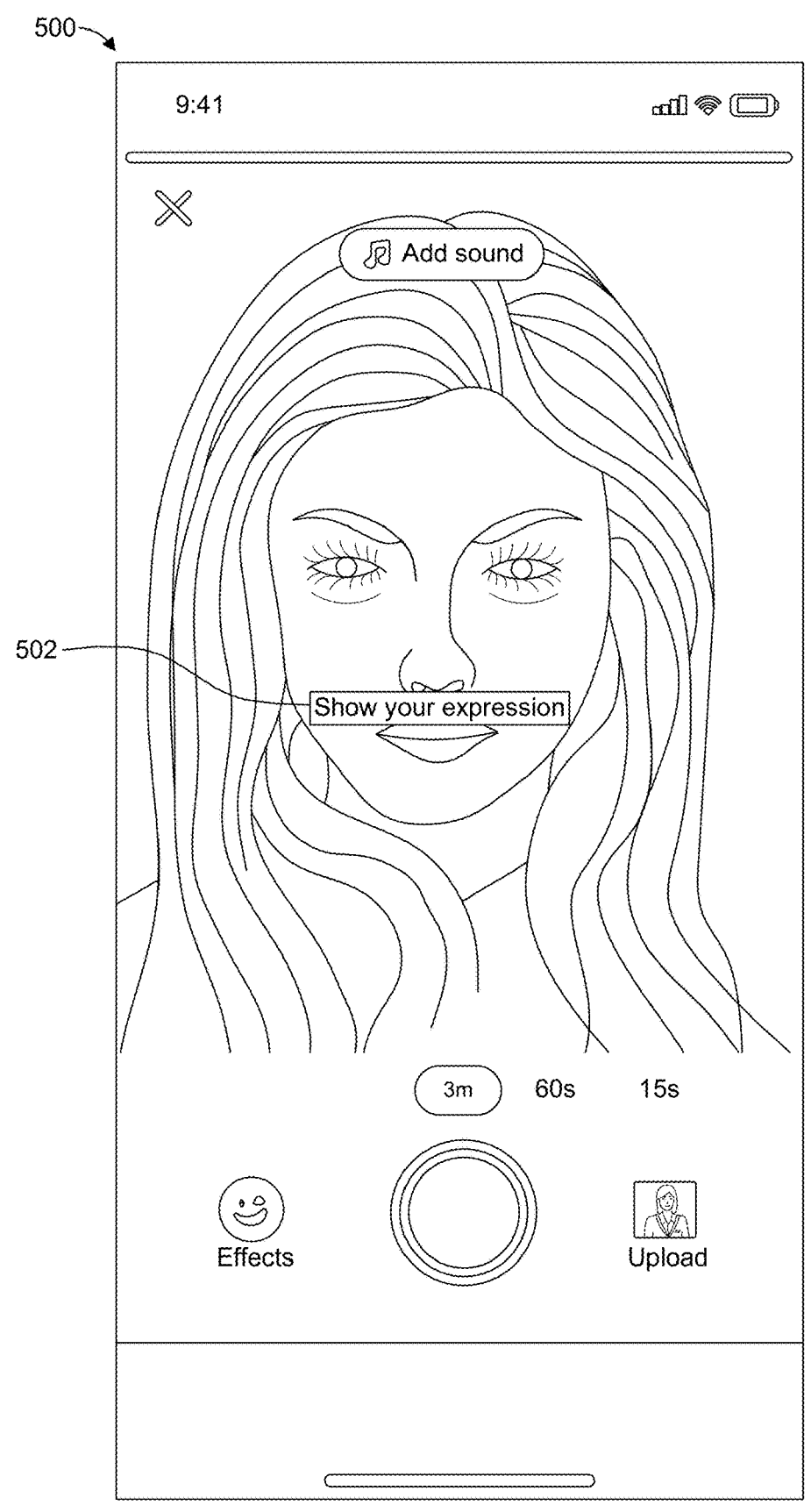
FIG. 5 shows an example user interface for creating real-time interactive videos in accordance with the present disclosure.
Figure 6:
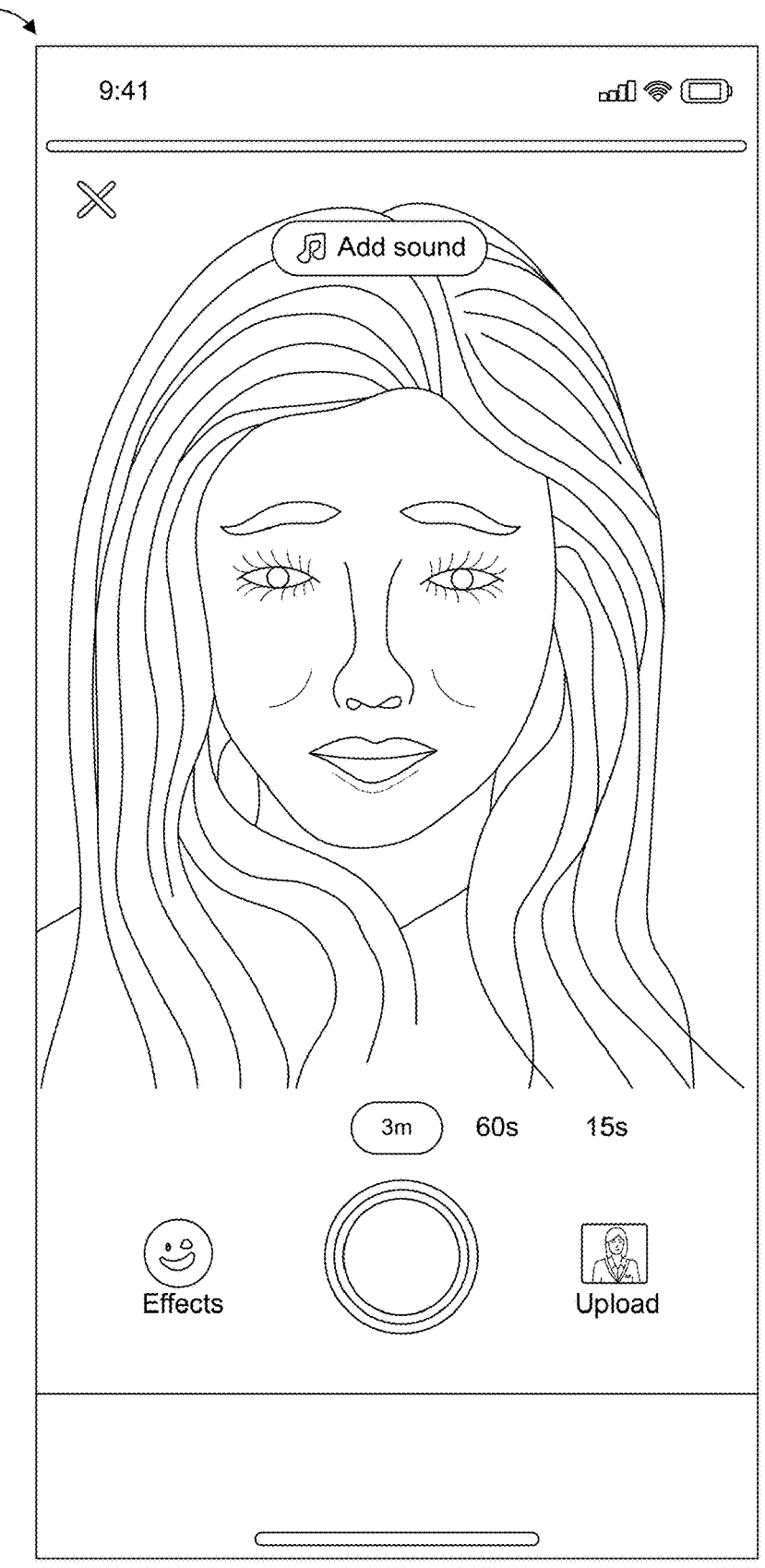
FIG. 6 shows an example user interface for creating real-time interactive videos in accordance with the present disclosure.

A source image may be generated based on the face at the predetermined location 202. For example, the source image may be generated based on scanning the face positioned at the predetermined location 202. As shown in FIG. 4, a UI 400 may be displayed indicating that the source image is in the process of being generated. The source image may be generated, for example, by a first machine learning model. The source image may depict a machine-generated character or avatar, such as a machine-generated character or avatar that resembles the user whose face is located at the predetermined location 202. As shown in FIG. 5, a UI 500 may be displayed based on (e.g., in response to) the source image being generated. The UI may display the source image. The UI 500 may display information (e.g., prompt) 502 configured to prompt the user to show one or more facial expressions. The user may move his or her face and/or show one or more facial expressions, such as in response to viewing the information 502. For example, the user may close her mouth. As shown in FIG. 6, a UI 600 may be displayed based on (e.g., in response to) the user moving his or her face. The UI 600 may display the one or more facial expressions on the source image. For example, the UI 600 may display the source image with a closed mouth based on the user closing her mouth. A real-time interactive video may be created by dynamically driving the source image based on the one or more facial expressions of the user (e.g., creator).

Figure 7:
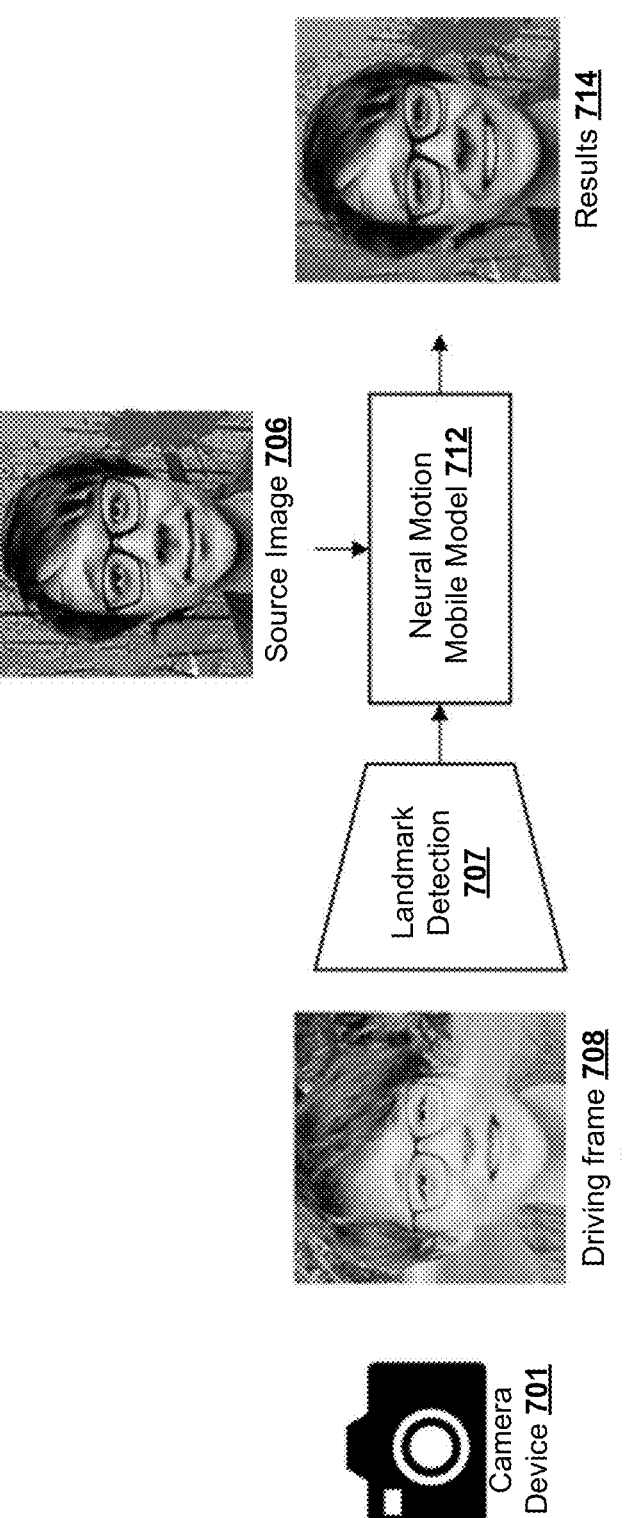
FIG. 7 shows an example system for creating real-time interactive videos in accordance with the present disclosure.

FIG. 7 illustrates an example system 700 in accordance with the present disclosure. The system 700 may be used for creating real-time interactive videos. For example, the system 700 may utilize a user's facial expression(s) to drive machine-generated image(s) to create dynamic, real-time interactive videos. The system 700 may comprise a neural motion mobile model 712. The neural motion mobile model 712 may be running on and/or installed on a user device (e.g., client device, mobile computing device, etc.).

A user may be prompted, such as via an interface of the user device (e.g., client device, mobile computing device, etc.), to capture an image of his or her face. For example, the user may be prompted or guided to position his or her face at a predetermined location on the interface. The user may utilize a camera device 701 associated with the user device to capture an initial user image (e.g., an image of the user's face at the predetermined location). The camera device 701 may be a component of the user device or separate from the user device. The initial user image may depict the user's face. The initial user image may be used to generate a source image 706. For example, the initial user image may be input into a first machine learning model. The first machine learning model may generate, based on the initial user image, the source image 706. The first machine learning model may generate the source image 706 by scanning the user's face positioned at the predetermined location. The source image 706 may depict a machine-generated character or avatar, such as a machine-generated character or avatar that resembles the user in the initial user image. The source image 706 may be input into the neural motion mobile model 712. The source image 706 may be output and displayed on an interface of the client device. For example, output of the source image 706 may be caused by the neural motion mobile model 712.

The user may capture one or more additional images (e.g., driving frame(s) 708, driving images, etc.). The driving frame(s) 708 may be continuously captured. For example, the driving frame(s) 708 may be the frames of a real-time video feed depicting the user's face. The user may capture the driving frame(s) 708 in response to being prompted, such as via the interface of the user device (e.g., client device, mobile computing device, etc.), to make various facial expressions or facial movements. The user may utilize the camera device 701 associated with the user device to capture the driving frame(s) 708.

A landmark detection model 707 may be configured to extract information from and/or determine information associated with each of the driving frame(s) 708 in real-time. The information may comprise facial image information, such as facial landmark data. The landmark detection model 707 may extract the information and/or determine the information using any suitable facial landmark recognition technique. The extracted facial image information may be input into the neural motion mobile model 712.

Information associated with the source image 706 may be determined. The information may indicate one or more features associated with the source image 706. The features may indicate, for example, a size (e.g., length, width) and/or shape of the machine-generated character head, hair color and/or length, facial feature (e.g., eye, nose, mouth, ears, eyebrows, etc.) positioning and/or shape, or any other feature of the source image 706. The information associated with the source image 706 may indicate a relationship between the source image 706 and the driving frame(s) 708. For example, the information associated with the source image 706 may indicate a size ratio between the machine-generated head depicted in the source image 706 and the user's head in the driving frame(s) 708. The information associated with the source image 706 may be input into the neural motion mobile model 712 along with the source image 706 and the driving frame(s) 708.

The neural motion mobile model 712 may be configured and trained to transfer facial expressions of creators to machine-generated images, such as the source image 706, in real-time. The neural motion mobile model 712 may transfer the facial expressions depicted in the driving frame(s) 708 to the source image 706. For example, the neural motion mobile model 712 may transfer the facial expressions depicted in the neural motion mobile model 712 to the source image 706 using the extracted facial image information and/or the information associated with the source image 706. The neural motion mobile model 712 may cause display of the facial expressions depicted in the driving frame(s) 708 on the source image 706, such as via the interface of the client device in real-time.

In embodiments, the neural motion mobile model 712 may create a real-time interactive video by dynamically driving the source image 706 based on the facial expressions depicted in the driving frame(s) 708. For example, the neural motion mobile model 712 may utilize neural motion generative adversarial networks (GAN) technology to dynamically drive the source image 706 based on the facial motion in the driving frame(s) 708. Dynamically driving the source image 706 based on the facial motion in the driving frame(s) 708 enhances interactivity for the user during the content creation process and creates a more dynamic effect for the final video output 714.

Figure 8:
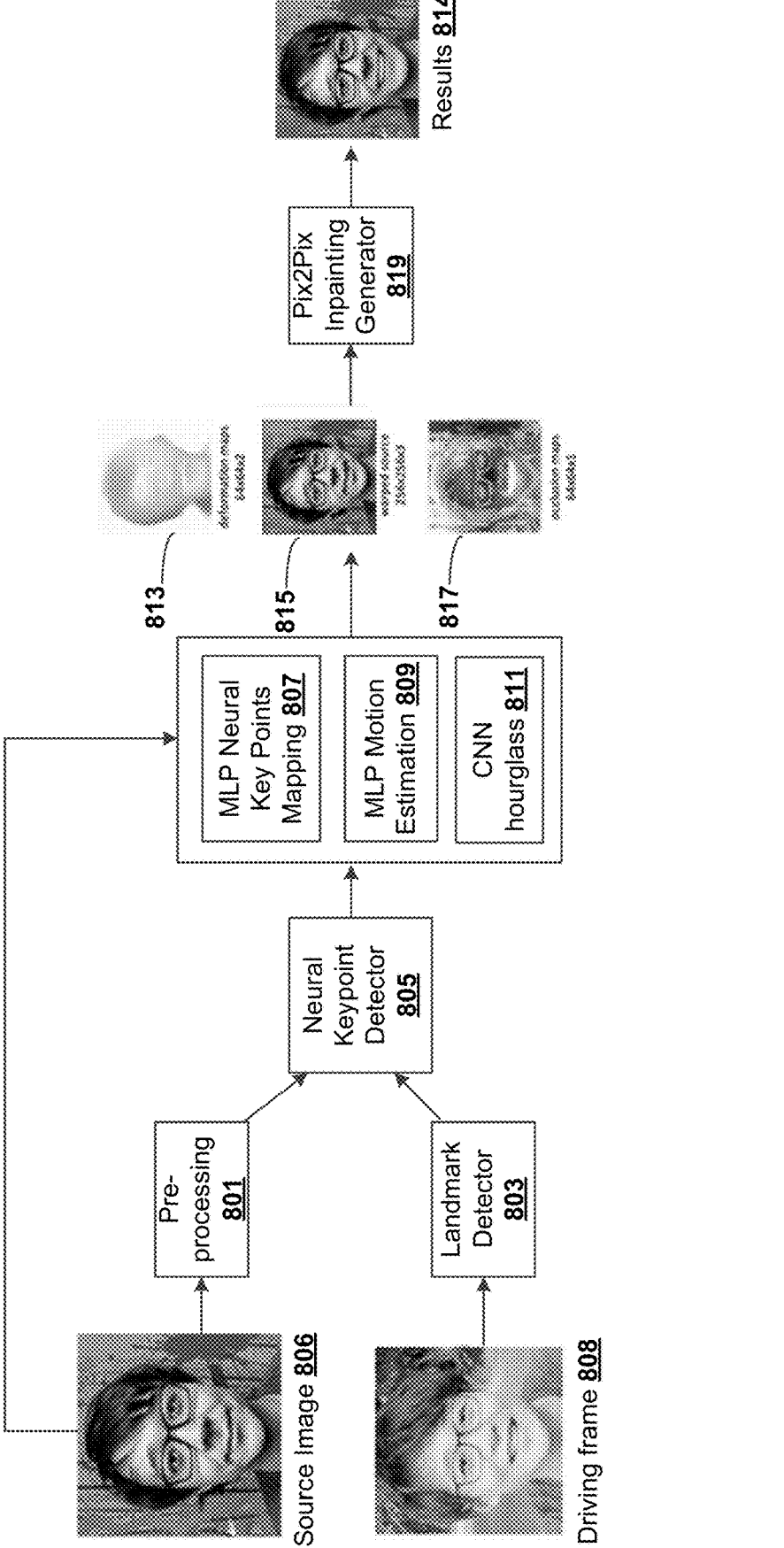
FIG. 8 shows an example system for creating real-time interactive videos in accordance with the present disclosure.

FIG. 8 illustrates an example system 800 in accordance with the present disclosure. The system 800 may be used for creating real-time interactive videos. For example, the system 800 may utilize a user's facial expression(s) to drive machine-generated images to create dynamic, real-time interactive videos. The system 800 may comprise a pre-processing component 801, a landmark detector 803, a neural key point detector 805, a multilayer perceptron (MLP) neural key points mapping model 807, a MLP motion estimation model 809, a convolutional neural network (CNN) hourglass model 811, and an inpainting generator 819. The neural key point detector 805, the MLP neural key points mapping model 807, the MLP motion estimation model 809, the convolutional neural network (CNN) hourglass model 811, and/or the inpainting generator 819 may each be components of a neural motion mobile model (e.g., neural motion mobile model 712) that is running on and/or installed on a user device (e.g., client device, mobile computing device, etc.).

A user may be prompted, such as via an interface of the user device (e.g., client device, mobile computing device, etc.), to capture an image of his or her face. For example, the user may be prompted or guided to position his or her face at a predetermined location on the interface. The user may utilize a camera device associated with the user device to capture an initial user image (e.g., an image of the user's face in the predetermined location). The camera device may be a component of the user device or separate from the user device. The initial user image may depict the user's face. The initial user image may be used to generate a source image 806. For example, the initial user image may be input into a first machine learning model. The first machine learning model may generate, based on the initial user image, the source image 806. The first machine learning model may generate the source image 806 by scanning the user's face positioned at the predetermined location. The source image 806 may depict a machine-generated character or avatar, such as a machine-generated character or avatar that resembles the user in the initial user image.

The user may capture one or more additional images (e.g., driving frame(s) 808, driving images, etc.). The driving frame(s) 808 may be continuously captured. For example, the driving frame(s) 808 may be the frames of a real-time video feed depicting the user's face. The user may capture the driving frame(s) 808 in response to being prompted, such as via the interface of the user device (e.g., client device, mobile computing device, etc.), to make various facial expressions or facial movements. The user may utilize the camera device associated with the user device to capture the driving frame(s) 808.

A landmark detection model 803 may be configured to extract information from and/or determine information associated with each of the driving frame(s) 808, such as in real-time. The information may comprise facial image information, such as facial landmark data. The landmark detection model 803 may extract the information and/or determine the information using any suitable facial landmark recognition technique. The extracted facial image information may be input into the neural key point detector 805.

The pre-processing model 801 may determine information associated with the source image 806. The information may indicate one or more features associated with the source image 806. The features may indicate, for example, a size (e.g., length, width) and/or shape of the machine-generated character head, hair color and/or length, facial feature (e.g., eye, nose, mouth, ears, eyebrows, etc.) positioning and/or shape, or any other feature of the source image 806. The information associated with the source image 806 may indicate a relationship between the source image 806 and the driving frame(s) 808. For example, the information associated with the source image 806 may indicate a size ratio between the machine-generated head depicted in the source image 806 and the user's head in the driving frame(s) 808. The information associated with the source image 806 may be input into the neural key point detector 805 along with the source image 806 and the driving frame(s) 808.

The neural key point detector 805 may be configured to detect (e.g., determine) key points indicative of one or more motion fields associated with the one or more facial expressions depicted in the driving frame(s) 808. The neural key point detector 805 may be configured to detect the key points by identifying and localizing specific points of interest in the driving frame(s) 808. The key points may provide essential information about the location, pose, and structure of the user's face or facial expressions within the driving frame(s) 808. The output of the neural key point detector 805 (e.g., the key points) may represent one or more motion fields associated with facial expression(s). The motion fields may indicate location(s) in the driving frame(s) 808 that are moving (e.g., the user's mouth, eyes, etc.).

The key points may be input into the MLP neural key points mapping model 807. The MLP neural key points mapping model 807 may generate a deformation file (e.g., deformation maps) 813 based on the key points. The deformation files 813 may indicate how to warp the source image 806. The source image 806 may be warped to generate a warped source image 815. The MLP motion estimation model 809 and the CNN hourglass model 811 may refine the motion fields associated with facial expression(s) and generate occlusion maps 817. The occlusion maps 817 may indicate how to refine, update, or improve the warped source image 815 so as to generate image(s) that are more closely resembles the facial expression(s) in the driving frame(s) 808.

The inpainting generator 819 may receive, as input, the warped source image 815 and the occlusion maps 817. The inpainting generator 819 may generate the results (e.g., result images/video) 814 based on the warped source image 815 and the occlusion maps 817. The results 814 resemble facial expression(s) in the driving frames 808 more closely than the warped source image 815. Dynamically driving the source image 806 based on the facial expression(s) and/or facial motion(s) in the driving frame(s) 808 enhances interactivity during a content creation process and creates a more dynamic effect for the final video output 814.

FIG. 9 illustrates an example process 900 for creating real-time interactive video. Although depicted as a sequence of operations in FIG. 9, those of ordinary skill in the art will appreciate that various embodiments may add, remove, reorder, or modify the depicted operations.

At 902, a source image may be generated. The source image may be generated by a first machine learning model. The source image may be generated based on capturing an image of a user. The image of the user may comprise a face of the user. The user may utilize a camera device associated with a user device to capture the image of the user. The camera device may be a component of the user device or separate from the user device. The first machine learning model may generate the source image by scanning the user's face in the image of the user. The source image may depict a machine-generated character or avatar, such as a machine-generated character or avatar that resembles the user in the image of the user.

At 904, one or more facial images of the user may be captured. The one or more facial images may depict one or more facial expressions. The one or more facial images may be continuously captured. For example, the one or more facial images may be the frames of a real-time video feed depicting the user's face. The user may capture the facial images in response to being prompted, such as via the interface of the user device (e.g., client device, mobile computing device, etc.), to make various facial expressions or facial movements. The user may utilize the camera device associated with the user device to capture the facial images. Information may be extracted from each of the facial images, such as in real-time. The information may comprise facial image information, such as facial landmark data. The information may be extracted from each of the facial images using any suitable facial landmark recognition technique.

At 906, the source image may be input into a second machine learning model. The information extracted from the one or more facial images may be input into the second machine learning model. The second machine learning model may be configured and trained to transfer facial expressions of creators to machine-generated images in real-time. The second machine learning model may transfer the facial expressions depicted in the facial images to the source image. For example, the second machine learning model may transfer the facial expressions depicted in the facial images to the source image using the extracted facial image information.

The second machine learning model may cause display of the facial expressions depicted in the facial images on the source image, such as via the interface of the client device in real-time. At 908, display of the one or more facial expressions may be caused. Display of the one or more facial expressions on the source image may be caused. For example, if the extracted facial image information corresponding to a first facial image of the facial image(s) indicates that the user is smiling in the first facial image, the second machine learning model may cause the machine-generated character or avatar depicted in the source image to smile. If the extracted facial image information corresponding to the next facial image of the facial image(s) indicates that the user is frowning in the next facial image, the second machine learning model may cause the machine-generated character or avatar depicted in the source image to stop smiling and start frowning.

At 910, a real-time interactive video may be created. The real-time interactive video may be created by dynamically driving the source image based on the one or more facial expressions. For example, the second machine learning model may utilize neural motion generative adversarial networks (GAN) technology to dynamically drive the source image based on the one or more facial expressions. Dynamically driving the source image based on the one or more facial expressions enhances interactivity for the user during the content creation process and creates a more dynamic effect for the final video output.

FIG. 10 illustrates an example process 1000 for creating real-time interactive video. Although depicted as a sequence of operations in FIG. 10, those of ordinary skill in the art will appreciate that various embodiments may add, remove, reorder, or modify the depicted operations.

At 1002, an interface may be caused to be displayed. The interface may be configured to guide a user to position a face at a predetermined location. The interface may be displayed on a user device (e.g., client device, mobile computing device, etc.). The user device may be associated with a camera device. The interface may be further configured to instruct the user to refrain from moving his or her face out of the predetermined location and/or to refrain from changing his or her facial expression. An image of the user's face in the predetermined location may be captured, such as by the camera device.

At 1004, a source image may be generated. The source image may be generated by a first machine learning model. The source image may be generated based on capturing the image of a user (e.g., the user's face). The user may utilize a camera device associated with a user device to capture the image of the user. The camera device may be a component of the user device or separate from the user device. The first machine learning model may generate the source image based on scanning the face positioned at the predetermined location. The source image may depict a machine-generated character or avatar, such as a machine-generated character or avatar that resembles the user in the image of the user.

At 1006, the source image may be input into a second machine learning model. Information extracted from one or more facial images of the user may be input into the second machine learning model. The second machine learning model may be configured and trained to transfer facial expressions of creators to machine-generated images in real-time. The second machine learning model may transfer the facial expressions depicted in the facial images to the source image. For example, the second machine learning model may transfer the facial expressions depicted in the facial images to the source image using the extracted facial image information.

FIG. 11 illustrates an example process 1100 for creating real-time interactive video. Although depicted as a sequence of operations in FIG. 11, those of ordinary skill in the art will appreciate that various embodiments may add, remove, reorder, or modify the depicted operations.

At 1102, a source image may be generated. The source image may be generated by a first machine learning model. The source image may be generated based on capturing an image of a user. The image of the user may comprise a face of the user. The user may utilize a camera device associated with a user device to capture the image of the user. The camera device may be a component of the user device or separate from the user device. The first machine learning model may generate the source image by scanning the user's face in the image of the user. The source image may depict a machine-generated character or avatar, such as a machine-generated character or avatar that resembles the user in the image of the user. At 1104, display of the source image generated by the first machine learning model may be caused. For example, display of the source image may be caused via an interface of the user device.

At 1106, information configured to prompt the user to show a facial expression may be caused to be displayed. The information configured to prompt the user to show a facial expression may be caused to be displayed based on (e.g., in response to) the source image being generated. The user may move his or her face and/or show one or more facial expressions, such as in response to viewing the information. For example, the user may close her mouth. Display of the one or more facial expressions on the source image may be caused. For example, display of the source image with a closed mouth may be caused based on the user closing her mouth. A real-time interactive video may be created by dynamically driving the source image based on the one or more facial expressions.

Figure 12:
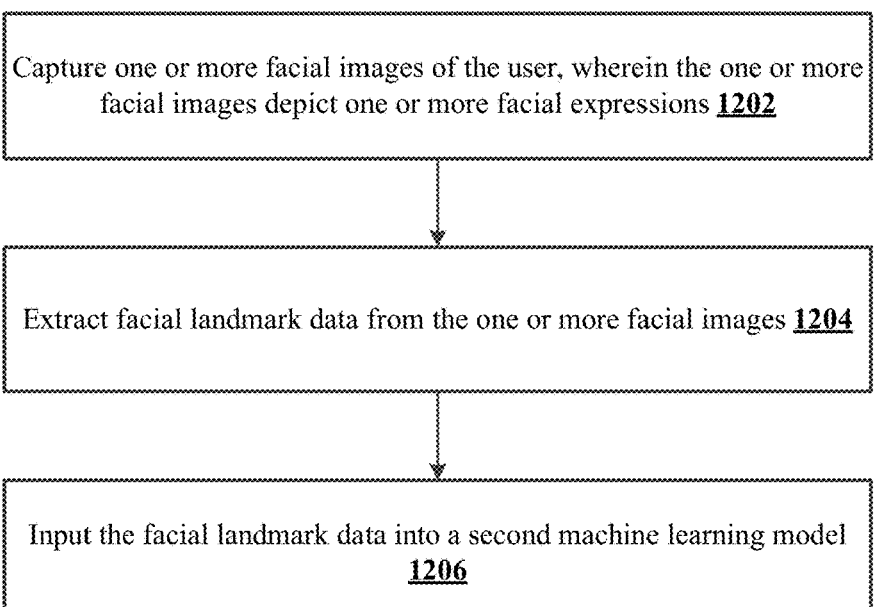
FIG. 12 shows an example process for creating real-time interactive videos in accordance with the present disclosure.

FIG. 12 illustrates an example process 1200 for creating real-time interactive video. Although depicted as a sequence of operations in FIG. 12, those of ordinary skill in the art will appreciate that various embodiments may add, remove, reorder, or modify the depicted operations.

At 1202, one or more facial images of the user may be captured. The one or more facial images may depict one or more facial expressions. The one or more facial images may be continuously captured. For example, the one or more facial images may be the frames of a real-time video feed depicting the user's face. The user may capture the facial images in response to being prompted, such as via an interface of the user device (e.g., client device, mobile computing device, etc.), to make various facial expressions or facial movements. The user may utilize a camera device associated with the user device to capture the facial images.

At 1204, facial landmark data may be extracted. The facial landmark data may be extracted from the one or more facial images. The facial landmark data may be extracted in real-time. The facial landmark data may be extracted from each of the facial images using any suitable facial landmark recognition technique. At 1206, the facial landmark data may be input into a second machine learning model. The second machine learning model may be configured and trained to transfer facial expressions of creators to machine-generated images, such as a source image, in real-time. The second machine learning model may transfer the facial expressions depicted in the one or more facial images to the source image. For example, the second machine learning model may transfer the facial expressions depicted in the one or more facial images to the source image using the facial landmark data. The second machine learning model may cause display of the facial expressions depicted in the one or more facial images on the source image, such as via the interface of the client device in real-time. For example, if the extracted facial landmark data corresponding to a first facial image indicates that the user is smiling in the first facial image, the second machine learning model may cause the machine-generated character or avatar depicted in the source image to smile. If the extracted facial landmark data corresponding to the next facial image indicates that the user is frowning in the next facial image, the second machine learning model may cause the machine-generated character or avatar depicted in the source image to stop smiling and start frowning.

FIG. 13 illustrates an example process 1300 for creating real-time interactive video. Although depicted as a sequence of operations in FIG. 13, those of ordinary skill in the art will appreciate that various embodiments may add, remove, reorder, or modify the depicted operations.

A second machine learning model may comprise a first sub-model (e.g., a neural key point detector), a second sub-model (e.g., a MLP neural key points mapping model, a MLP motion estimation model, and a CNN hourglass model), and a third sub-model (e.g., an inpainting generator). The second machine learning model may be running on and/or installed on a user device (e.g., client device, mobile computing device, etc.).

A user may be prompted, such as via an interface of the user device (e.g., client device, mobile computing device, etc.), to capture an image of his or her face. For example, the user may be prompted or guided to position his or her face at a predetermined location on the interface. The user may utilize a camera device associated with the user device to capture an initial user image (e.g., an image of the user's face in the predetermined location). The camera device may be a component of the user device or separate from the user device. The initial user image may depict the user's face. The initial user image may be used to generate a source image. For example, the initial user image may be input into a first machine learning model. The first machine learning model may generate, based on the initial user image, the source image. The first machine learning model may generate the source image by scanning the user's face positioned at the predetermined location. The source image may depict a machine-generated character or avatar, such as a machine-generated character or avatar that resembles the user in the initial user image. The source image may be input into the second machine learning model.

The user may capture one or more additional images (e.g., driving frame(s), driving images, etc.). The driving frame(s) may be continuously captured. For example, the driving frame(s) may be the frames of a real-time video feed depicting the user's face. The user may capture the driving frame(s) in response to being prompted, such as via the interface of the user device (e.g., client device, mobile computing device, etc.), to make one or more facial expressions or facial movements. The user may utilize the camera device associated with the user device to capture the driving frame(s).

A landmark detection model may be configured to extract information from and/or determine information associated with each of the driving frame(s) in real-time. The information may comprise facial image information, such as facial landmark data. The landmark detection model may extract the information and/or determine the information using any suitable facial landmark recognition technique. The extracted facial image information may be input into the first sub-model (e.g., a neural key point detector) of a second machine learning model.

At 1302, key points may be detected. The key points may be indicative of one or more motion fields. The one or more motion fields may be associated with the one or more facial expressions depicted in the driving frames. The key points may be detected by a first sub-model (e.g., a neural key point detector) of a second machine learning model. The key points may be detected based on the extracted facial image information. The neural key point detector may be configured to detect (e.g., determine) key points indicative of one or more motion fields associated with the one or more facial expressions depicted in the driving frames. The neural key point detector may be configured to detect the key points by identifying and localizing specific points of interest in the driving frames. The key points may provide essential information about the location, pose, and structure of the user's face or facial expressions within the driving frames.

The key points may be input into the second sub-model of the second machine learning model (e.g., a MLP neural key points mapping model). At 1304, a deformation file may be generated. The deformation file may be generated based on the key points by the second sub-model of the second machine learning model. The MLP neural key points mapping model may generate a deformation file (e.g., deformation maps) based on the key points. The deformation file may indicate how to warp the source image.

At 1306, the one or more motion fields may be refined by the second sub-model of the second machine learning model (e.g., a MLP motion estimation model and a CNN hourglass model). Occlusion maps may be generated by the second sub-model of the second machine learning model. The occlusion maps may indicate how to refine, update, or improve a warped source image so as to more closely resemble facial expression(s) and/or facial motion(s) in the driving frame(s).

At 1308, the source image may be deformed (e.g., warped). The source image may be deformed based on the deformation file. The source image may be deformed by the second sub-model of the second machine learning model. The source image may be deformed based on the deformation file to generate a deformed/warped source image.

At 1310, the occlusion maps and the deformed source image may be input into a third sub-model (e.g., an inpainting generator) of the second machine learning model. The deformed source image may be input into the third sub-model of the second machine learning model. The third sub-model may receive, as input, the deformed source image and the occlusion maps. At 1312, one or more result images (e.g., result image 814) may be generated. The one or more result images may depict one or more facial expression(s) and/or facial motion(s) in driving frame(s) (e.g., driving frame 808) on the source image (e.g., source image 806). The one or more result images may be generated by the third sub-model of the second machine learning model. The third sub-model may generate the one or more result images by further refining the deformed source image based on the occlusion maps. The one or more result images generated by the third sub-model resembles the facial expression(s) and/or facial motion(s) in the driving frame(s) more closely than the deformed source image. Dynamically driving the source image based on the facial expression(s) and/or facial motion(s) in the driving frame(s) enhances interactivity during a content creation process and creates a more dynamic effect for the final video output.

Figure 14:
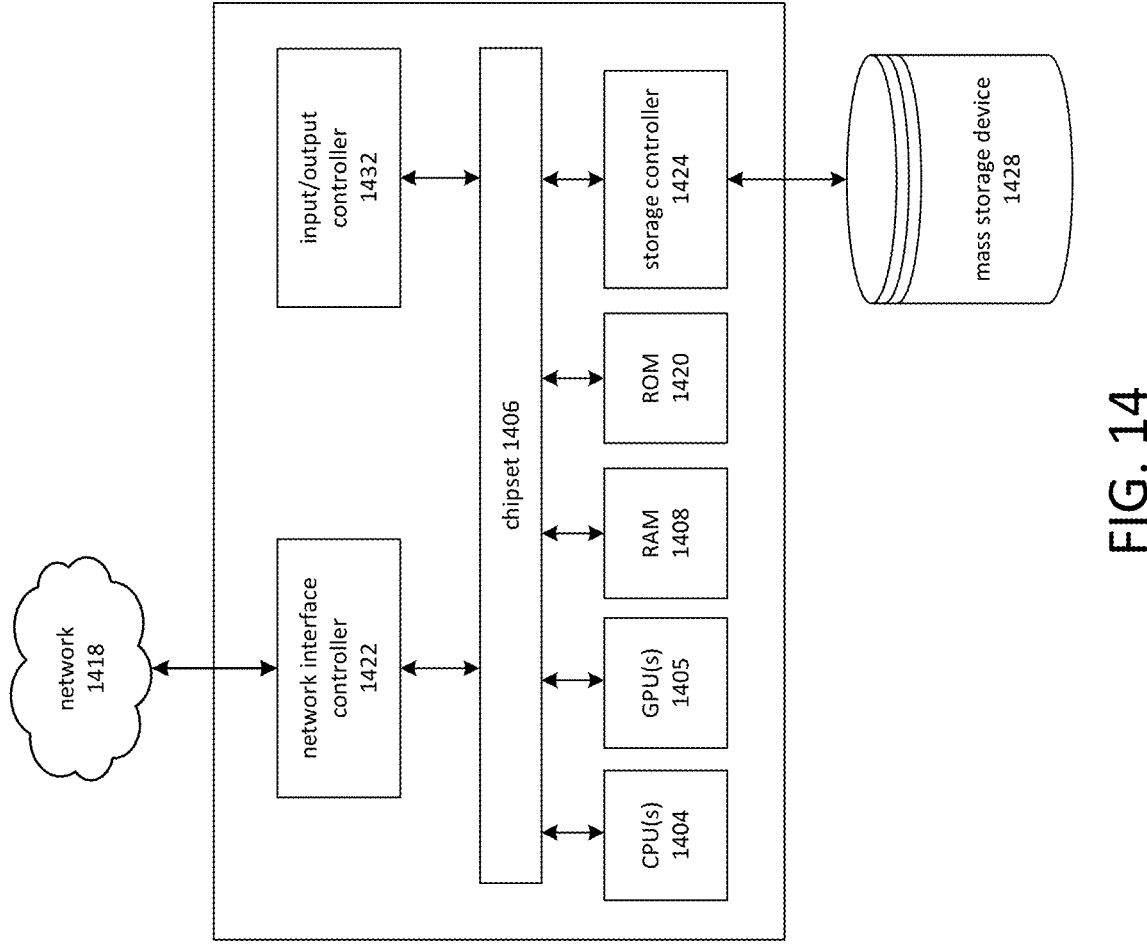
FIG. 14 shows an example computing device which may be used to perform any of the techniques disclosed herein.

FIG. 14 illustrates a computing device that may be used in various aspects, such as the services, networks, modules, and/or devices depicted in any of FIGS. 1-8. With regard to FIGS. 1-8, any or all of the components may each be implemented by one or more instance of a computing device 1400 of FIG. 14. The computer architecture shown in FIG.

14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of creating a real-time interactive video, comprising:

capturing an image of a user, wherein the image comprises a face of the user;

displaying an interface by a device during a process of generating a source image based on the captured image, wherein the interface comprises an indication that the process of generating the source image using a first machine learning model is in progress, and wherein the source image comprises a machine-generated avatar of the user;

displaying a message by the device in response to determining that the process of generating the source image is complete, wherein the message prompts the user to make one or more facial expressions;

capturing one or more facial images of the user by the device, wherein the one or more facial images depict the one or more facial expressions;

inputting, via the device, the source image and information extracted from the one or more facial images into a second machine learning model, wherein the second machine learning model is configured and trained to transfer facial expressions of creators to machine-generated images in real-time;

causing to display the one or more facial expressions on the machine-generated avatar of the user by the device; and creating, by the device, the real-time interactive video by dynamically driving the machine-generated avatar of the user based on the one or more facial expressions.

2. The method of claim 1, further comprising:

causing to display an interface configured to guide the user to position the face at a predetermined location; and generating the source image by the first machine learning model based on scanning the face positioned at the predetermined location.

3. The method of claim 1, further comprising:

causing to display the source image generated by the first machine learning model; and causing to display information configured to prompt the user to show a facial expression.

4. The method of claim 1, further comprising:

extracting facial landmark data from the one or more facial images; and inputting the facial landmark data into the second machine learning model.

5. The method of claim 4, further comprising:

detecting key points indicative of one or more motion fields associated with the one or more facial expressions by a first sub-model of the second machine learning model.

6. The method of claim 5, further comprising:

generating a deformation file based on the key points by a second sub-model of the second machine learning model; and refining the one or more motion fields and generating occlusion maps by the second sub-model of the second machine learning model.

7. The method of claim 6, further comprising:

deforming the source image based on the deformation file by the second sub-model of the second machine learning model.

8. The method of claim 7, further comprising:

inputting the occlusion maps and the deformed source image into a third sub-model of the second machine learning model; and generating one or more images that comprises the one or more facial expressions on the source image by the third sub-model of the second machine learning model.

9. The method of claim 1, wherein the method is implemented by a mobile computing device.

10. A system of creating a real-time interactive video, comprising:

at least one processor; and at least one memory communicatively coupled to the at least one processor and comprising computer-readable instructions that upon execution by the at least one processor cause the at least one processor to perform operations comprising:

capturing an image of a user, wherein the image comprises a face of the user;

displaying an interface by a device during a process of generating a source image based on the captured image, wherein the interface comprises an indication that the process of generating the source image using a first machine learning model is in progress, and wherein the source image comprises a machine-generated avatar of the user;

displaying a message by the device in response to determining that the process of generating the source image is complete, wherein the message prompts the user to make one or more facial expressions;

capturing one or more facial images of the user by the device, wherein the one or more facial images depict the one or more facial expressions;

inputting, via the device, the source image and information extracted from the one or more facial images into a second machine learning model, wherein the second machine learning model is configured and trained to transfer facial expressions of creators to machine-generated images in real-time;

causing to display the one or more facial expressions on the machine-generated avatar of the user by the device; and creating, by the device, the real-time interactive video by dynamically driving the machine-generated avatar of the user based on the one or more facial expressions.

11. The system of claim 10, the operations further comprising:

causing to display an interface configured to guide the user to position the face at a predetermined location; and generating the source image by the first machine learning model based on scanning the face positioned at the predetermined location.

12. The system of claim 10, the operations further comprising:

causing to display the source image generated by the first machine learning model; and causing to display information configured to prompt the user to show a facial expression.

13. The system of claim 10, the operations further comprising:

extracting facial landmark data from the one or more facial images; and inputting the facial landmark data into the second machine learning model.

14. The system of claim 13, the operations further comprising:

detecting key points indicative of one or more motion fields associated with the one or more facial expressions by a first sub-model of the second machine learning model.

15. The system of claim 14, the operations further comprising:

generating a deformation file based on the key points by a second sub-model of the second machine learning model;

deforming the source image based on the deformation file by the second sub-model of the second machine learning model; and refining the one or more motion fields and generating occlusion maps by the second sub-model of the second machine learning model.

16. The system of claim 15, the operations further comprising:

inputting the occlusion maps and the deformed source image into a third sub-model of the second machine learning model; and generating one or more images that comprises the one or more facial expressions on the source image by the third sub-model of the second machine learning model.

17. A non-transitory computer-readable storage medium, storing computer-readable instructions that upon execution by a processor cause the processor to implement operations comprising:

capturing an image of a user, wherein the image comprises a face of the user;

displaying an interface by a device during a process of generating a source image based on the captured image, wherein the interface comprises an indication that the process of generating the source image using a first machine learning model is in progress, and wherein the source image comprises a machine-generated avatar of the user;

displaying a message by the device in response to determining that the process of generating the source image is complete, wherein the message prompts the user to make one or more facial expressions;

capturing one or more facial images of the user by the user device, wherein the one or more facial images depict the one or more facial expressions;

inputting, via the device, the source image and information extracted from the one or more facial images into a second machine learning model, wherein the second machine learning model is configured and trained to transfer facial expressions of creators to machine-generated images in real-time;

causing to display the one or more facial expressions on the machine-generated avatar of the user by the device; and creating, by the device, the real-time interactive video by dynamically driving the machine-generated avatar of the user based on the one or more facial expressions.

18. The non-transitory computer-readable storage medium of claim 17, the operations further comprising:

extracting facial landmark data from the one or more facial images; and inputting the facial landmark data into the second machine learning model.

19. The non-transitory computer-readable storage medium of claim 18, the operations further comprising:

detecting key points indicative of one or more motion fields associated with the one or more facial expressions by a first sub-model of the second machine learning model;

generating a deformation file based on the key points by a second sub-model of the second machine learning model;

deforming the source image based on the deformation file by the second sub-model of the second machine learning model; and refining the one or more motion fields and generating occlusion maps by the second sub-model of the second machine learning model.

20. The non-transitory computer-readable storage medium of claim 19, the operations further comprising:

inputting the occlusion maps and the deformed source image into a third sub-model of the second machine learning model; and generating one or more images that comprises the one or more facial expressions on the source image by the third sub-model of the second machine learning model.

* * * * *